Sept. 3, 1968
J. G. GRAY
3,399,617
GAS EXHAUST VENTILATOR
Filed March 17, 1967
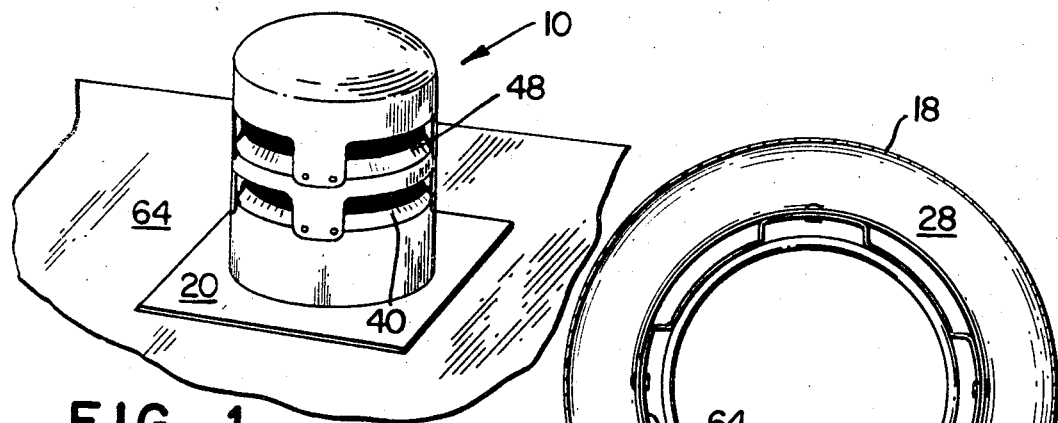
FIG_1
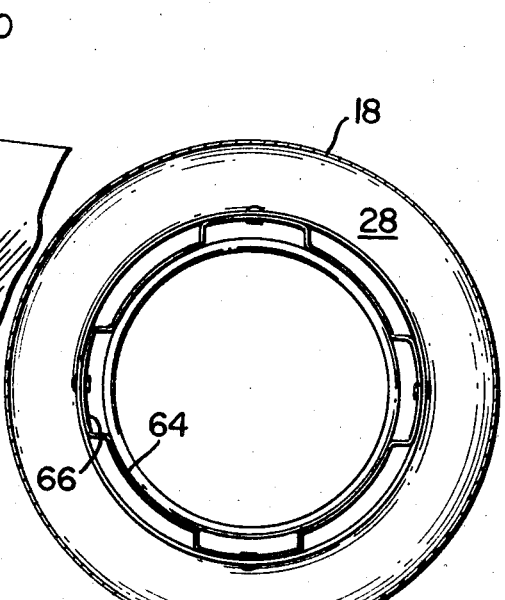
FIG_3
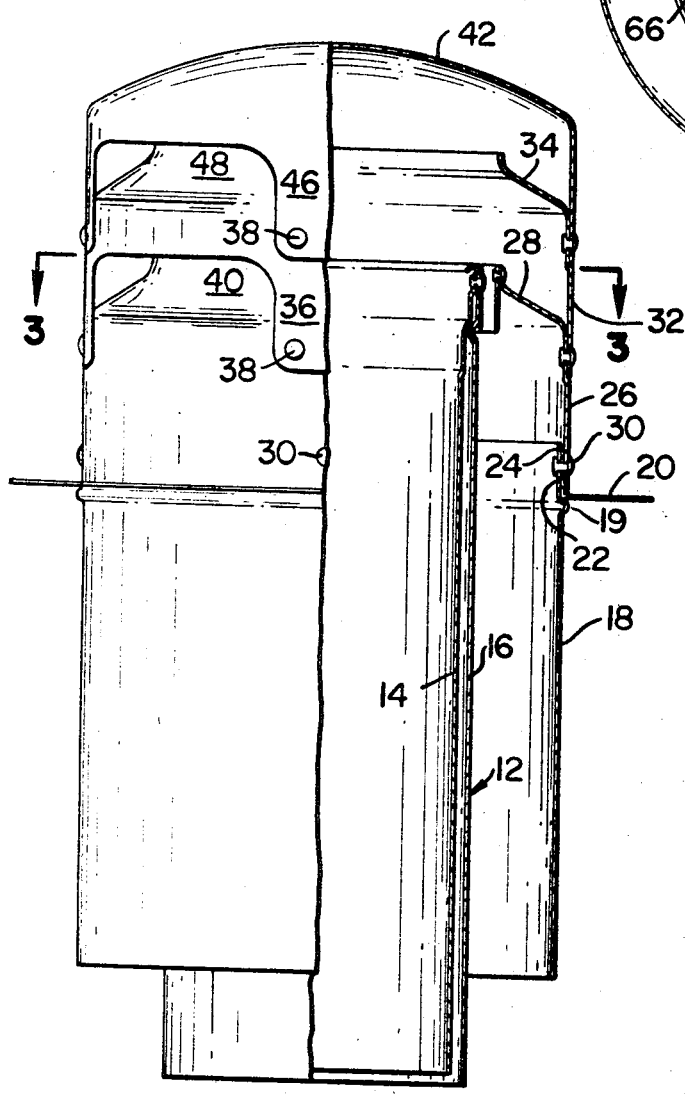
FIG_2
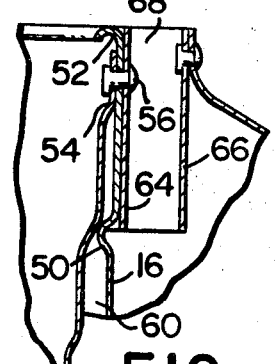
FIG_4
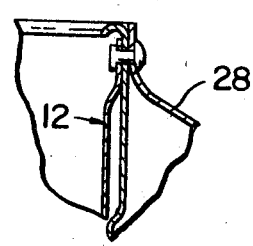
FIG_5
INVENTOR.
JACK G. GRAY
BY
*Owen, Wickersham & Erickson*
ATTORNEYS

United States Patent Office 3,399,617
Patented Sept. 3, 1968

3,399,617
GAS EXHAUST VENTILATOR
Jack G. Gray, Los Altos, Calif., assignor to Wallace-Murray Corporation, New York, N.Y., a corporation of Delaware
Filed Mar. 17, 1967, Ser. No. 624,060
3 Claims. (Cl. 98—60)

ABSTRACT OF THE DISCLOSURE

A vent top for connection to a pipe or flue extending from a heating device within a housing unit is provided and comprises a plurality of tubular top members which are axially spaced apart and connected together by circumferentially spaced apart leg portions which define adjacent openings, an uppermost tubular top member having a dome-shaped end. The other said top members are open at both ends and taper inwardly at one end from the attached leg portions of the adjoining top member.

---

This invention relates to an improved end cap or top for use on the vent pipes or flues from stoves, furnaces or other heating units and particularly those installed in relatively small buildings, trailers or mobile homes and the like.

Tops or caps on flue or vent pipes are necessary to prevent the influx of rain and foreign articles into the vent opening, and yet they must function to maintain the maximum flow of warm air or hot gases through the pipe and, if possible, provide an aspirating effect within the vent pipe when wind strikes the top from any horizontal direction. A general object of the present invention is to provide an improved vent top that fulfills all of these requirements.

Another object of my invention is to provide a vent top that is particularly adaptable for use with heating units in small housing units. Here, it is necessary to make the most efficient use of space and yet provide adequate projection and insulation between the heat-carrying conduit and inflammable structural materials. This is accomplished in the present invention by a structural arrangement that provides an annular insulating air layer completely around the vent pipe at its junction with the top. With this feature my top can be installed with remarkable ease and safety in close proximity to other structures where space is a premium, for example, in trailer homes and the like.

A more specific object of my invention is to provide a vent top wherein an increased flow of warm air or gas from the vent pipe causes an increased flow of cooling air around the vent pipe directly adjacent to the top, thereby helping to maintain the unit within acceptable temperature limits.

Still another object of the present invention is to provide a vent top that is particularly adaptable for ease and economy of manufacture. In structural terms my vent is a unique combination of a relatively small number of parts which may be easily formed and assembled with a minimum of labor and using conventional apparatus. It is readily adaptable to various sizes and types of heating units and is a vent top having a pleasing appearance which is particularly adaptable for use on a movable housing unit such as a trailer.

Other objects, advantages and features of the present invention will become apparent from the following detailed description presented with the accompanying drawings, in which:

FIG. 1 is a view in perspective of a vent top embodying the principles of the present invention;

FIG. 2 is an enlarged view in elevation and partially in section of the top shown in FIG. 1;

FIG. 3 is a view taken along line 3—3 of FIG. 2;

FIG. 4 is a greatly enlarged fragmentary view showing internal details of the vent top of FIGS. 1–3;

FIG. 5 is a view similar to FIG. 4 showing a slightly modified form of vent top according to my invention.

Referring to the drawing, a vent top 10 embodying the principles of the present invention is shown in FIG. 1 as it appears in a typical installation, such as on a trailer or a small housing unit. Normally, the top is connected to a heat producing unit within the housing unit, such as a gas heater or stove (not shown). As seen in FIG. 2, the top is a combination of a number of sheet metal parts, a central component being a stub pipe section 12 having an inner wall section 14 and a concentric outer wall section 16 that are spaced apart radially along their length but are connected together at their upper end. Located concentrically around the central stub pipe section and spaced outwardly therefrom is an outer tubular body member 18. Spaced downwardly below the upper end of this body member 18 is an annular bead 19 and resting thereon is a flat sheet metal plate 20 whose plane is normally perpendicular to the central pipe section. The latter has an opening 22 through which the body member extends, and an upright flange 24 around the opening 22 which lies against the outer surface of the body member. Extending down over the plate flange 24 is a lower tubular top member 26 having a tapered upper end portion 28 terminating in a diameter smaller than the lower body member but slightly larger than the central pipe stub section. The lower tubular top member 26 is secured to the lower body member 18 and to the flange 24 of the flash plate 22 by a series of fasteners 30 such as rivets which are spaced apart circumferentially and extend through all three of these elements, thereby holding them tightly together.

Extending down over the lower tubular top 26 member is a similarly shaped upper tubular top member 32. This latter member has a necked-down or tapered upper end 34 similar to the tapered end portion of the lower tubular member. However, the lower end of the upper tubular member has cutout portions that form axially extending and circumferentially spaced apart legs 36. These legs each have a width measured along the circumference of the tubular top member which is considerably less than the width of an adjacent cutout portion and they are fastened as by rivets 38 or the like to the lower tubular top member 26 just below its tapered upper end 28. Thus, the cutout portions between the legs 36 form circumferentially spaced apart exit openings 40 in the vent top. In the embodiment shown, the tubular member 32 has four legs 36 which are evenly spaced apart to define an equal number of openings 40. However, a different number of legs could be employed within the scope of the invention.

A tubular top end member 42 having a dome-shaped upper end and a diameter substantially equal to the members 26 and 32 also has cutout portions on the cylindrical walls of its lower end forming a series of spaced apart legs 44 separating openings 46 similar to those on the upper tubular top members. These latter legs 44 of the top member 42 extend down over and are fastened by rivets 48 or the like to the upper tubular top member 32 just below its tapered end portion 34.

As illustrated, the upper tapered end portions of the upper and lower tubular top members 26 and 32 taper gradually from a cylindrical shape at the lower end to a conical shape and then substantially back to a cylindrical shape of a smaller diameter at their extreme end. It is seen from the description thus far that the top 10 is comprised of a series of similar tubular members that are connected to each other by the axially extending leg portions which overlap and are attached to an adjacent member thereby forming a series of openings to the end of the vent pipe stub 12.

The details of a typical double-wall vent pipe construction particularly adaptable to the present invention are shown in FIG. 4. The outer pipe sleeve section 16 has an annular indentation forming a bead 50 on its inner surface which is spaced downwardly from an upper end portion 52 that curves over inwardly around its edge. The inner pipe sleeve section 14 has an upper end portion 54 that lies flush against the inner surface of the outer pipe within the curved-over end portion 52 thereof and is secured by a series of rivets 56. From the aforesaid end portion the inner pipe section 14 tapers inwardly away from the outer pipe section 16 and further along its length it engages the bead 50 at a shoulder 58 at which point the inner pipe section is further reduced in diameter to form an insulating air space 60 between the pipe sections that extends downwardly along the remaining length of the pipe stub 12.

The central stub pipe section 12 may be connected directly to the tapered end portion 28 of the lower tubular top member 26 by a series of the rivets 62 or the like, as shown in FIG. 5. However, for some installations I have found it to be advantageous to provide a small amount of space between the central pipe stub section 12 and the lower tubular top member 26. As shown best in FIG. 3, the amount of opening desired can be maintained by means of a generally annular spacer band 64 which has circumferentially spaced apart radially projecting portions 66. These latter portions are fixed to the lower tubular top member while the inner part of the band is fixed to the pipe stub section thereby providing an annular opening 68 between the top edges of the lower tubular top member and the pipe stub section. With this arrangement the efflux of the hot air through the central pipe 12 flowing past the opening 68 between it and the lower top section helps to cause a circulation of air around the pipe section 12 between it and the lower body member 18. This cooling air is the ambient air drawn from within the trailer or whatever housing unit the vent top is used on.

The installation and operation of my vent top 10 should be readily apparent from the foregoing description. A circular opening for receiving the vent top is provided in the vehicle roof structure 64 preferably with a diameter slightly greater than that of the bead 19. The lower body 18 of the vent top may be inserted through the vehicle opening from the top so that the flashing plate 20 lies flush on the outside surface of the vehicle surrounding the opening and is fixed thereto by any suitable means. When installed, the central pipe stub 12 is connected by the necessary pipe sections to the heating unit or stove of the trailer or housing unit (not shown). The lower body member 18 open to the ambient air within the trailer thus forms a protective sleeve around the stub pipe and allows air to circulate around the pipe. As mentioned above, an increased circulation of this sleeve of cooling air may be induced by providing the opening 68 between the pipe stub 12 at its upper end and the lower tubular top member 26.

The construction and assembly of my top is greatly simplified by the fact that the essential parts are few and similar in size and shape. For example, the tubular top members 26 and 32 are similar except for the fact that the lower end of the lower top member 26 is not cut out to form leg portions. The end member 42 is similar to the upper tubular member 32 except that it has a dome at one end instead of a conical end portion like both members 26 and 32. With the general arrangement shown, it is apparent that one or more tubular top members could be used to provide the exact number of exit openings in the top which produce the desired result.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A vent top for connection to a conduit extending from a heating unit within a building comprising in combination:
   a central stub pipe section;
   a lower tubular member located concentrically around said stub pipe section and having a tapered upper end portion;
   means connecting the upper end of said stub pipe section to said upper end portion of tubular member;
   a protective sleeve connected to the lower end of said lower tubular member;
   an intermediate tubular member having a tapered upper end portion and circumferentially spaced apart and downwardly extending leg portions at its lower end fixed to said lower tubular member below its tapered upper end portion and forming a first series of exit openings;
   and a tubular end member having a dome shaped cover and integral, circumferentially spaced apart and downwardly extending leg portions fixed to said intermediate tubular member below its tapered end portion and forming a second series of circumferentially spaced apart openings for gases from said stub pipe section.

2. The vent top as described in claim 1 including an annular bead spaced downwardly from the upper end of and a transverse planar mounting plate located around said sleeve, and having an annular flange means fixed thereto.

3. The vent top as described in claim 1 wherein said means for connecting the pipe stub to said lower tubular member includes an annular spacer member having circumferentially spaced apart projections fixed to the upper end of said tubular member and providing for a circulation of cooling air between the vent pipe stub and said sleeve.

References Cited
UNITED STATES PATENTS

| | | | |
|---|---|---|---|
| 2,763,196 | 9/1956 | Singleton | 98—46 |
| 2,841,071 | 7/1958 | Strawsine | 98—46 |
| 2,856,837 | 10/1958 | Thulman | 98—46 |
| 3,082,758 | 3/1963 | Heiman | 126—307 XR |
| 3,087,408 | 4/1963 | Carr | 98—46 |
| 3,160,087 | 12/1964 | Davidson | 98—46 |
| 3,315,586 | 3/1967 | Marrapese et al. | 126—307 XR |

ROBERT A. O'LEARY, *Primary Examiner.*

M. A. ANTONAKAS, *Assistant Examiner.*